UNITED STATES PATENT OFFICE.

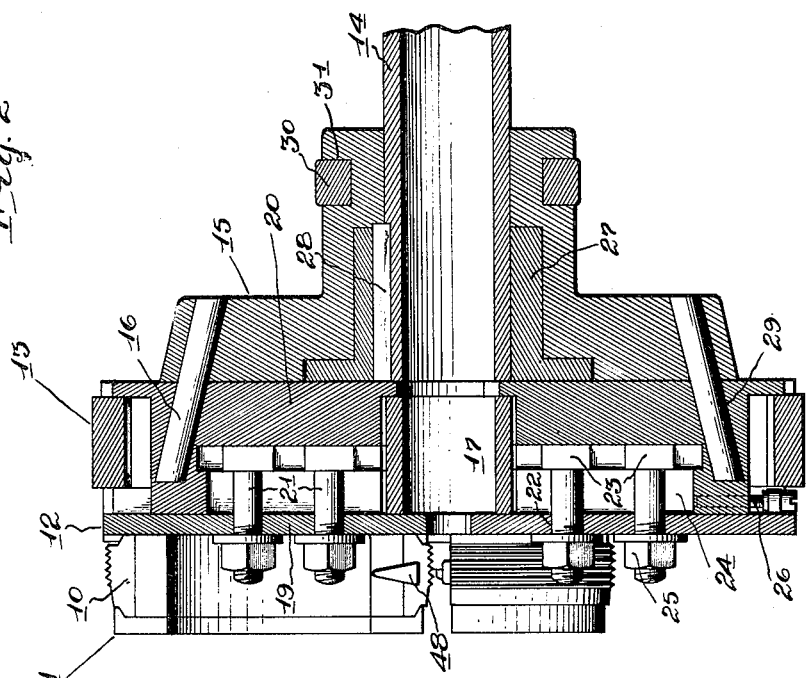
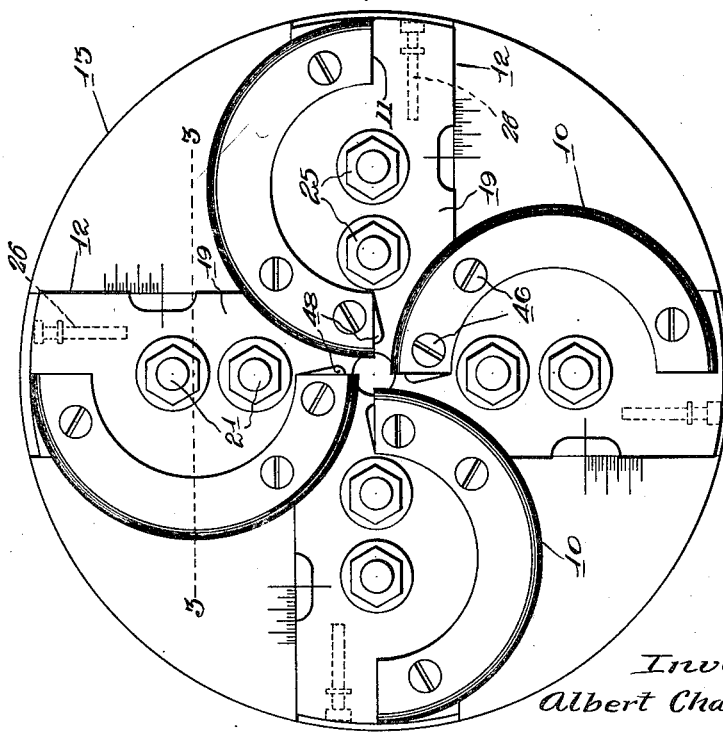

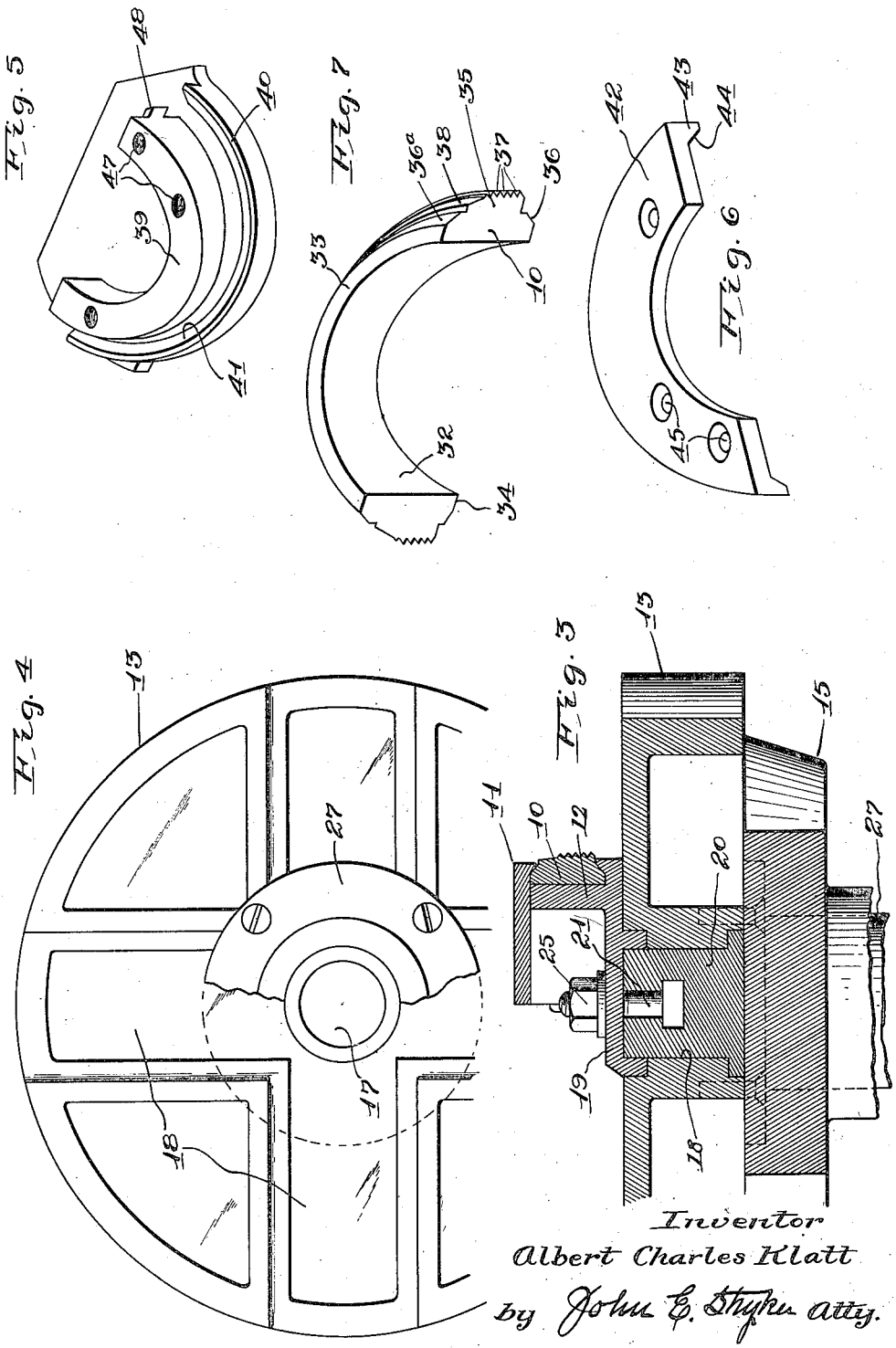

ALBERT CHARLES KLATT, OF BEAVER DAM, WISCONSIN.

THREAD-CUTTING DEVICE.

1,262,516.  Specification of Letters Patent.  Patented Apr. 9, 1918.

Application filed March 9, 1917. Serial No. 153,638.

*To all whom it may concern:*

Be it known that I, ALBERT CHARLES KLATT, a citizen of the United States, residing at Beaver Dam, in the county of Dodge and State of Wisconsin, have invented new and useful Improvements in Thread-Cutting Devices, of which the following is a specification.

The object of my invention is to provide a simple, durable and efficient thread cutting device having novel dies and holders therefor.

More specifically, it is my object to increase the efficient length of the dies by curving them and thereby extend their longevity.

Further objects are to increase the natural clearance between the dies and the material to be threaded and to provide a combination in which the curved dies may be readily removed and re-sharpened and quickly and easily replaced in operative positions.

In the drawings, Figure 1 is a front elevation of my improved device; Fig. 2 is a central longitudinal sectional view thereof; Fig. 3 is a sectional view taken on the line 3—3 of Fig. 1; Fig. 4 is a rear elevation in detail of the die head; Fig. 5 is a detail perspective view of the base of one of the die holders; Fig. 6 is a detail perspective view of the cover or clamping member of said holder; and Fig. 7 is a detail perspective view of my improved die.

Referring to the drawings, it will be seen that my improved dies 10 are mounted in holders 11 on radially movable slides 12 in a die head 13. Said die head is carried upon a barrel 14 which is suitably supported and rotated by any convenient source of power. An axially slidable adjustment head 15 on said barrel is equipped with fingers 16 which co-act with the slides 12 in the die head and effect the adjustment of said slides simultaneously, whereby the dies 10 may be advanced toward and withdrawn from an object to be cut.

The die head 13 is a drum having an axial bore 17 and radial ways 18 therein. The slides 12 each consist of a plate 19 and a block 20, the former being slidable upon the face of the drum, while the latter is slidable in a way 18. Said plate and block, though normally rigidly connected, are adjustable longitudinally with respect to each other. To provide for this adjustment, I employ a pair of bolts 21 which pass through apertures 22 in the plate, and the bolt heads 23, which are square, fit slidably in a T-groove 24 in the block 20. Nuts 25 on the bolts 21 clamp the plate and block together in varying positions with respect to each other. An adjusting screw 26, threaded in the block 20 and having a revoluble connection with the plate 19, provides for accurately shifting the latter with respect to the former and for holding said parts together when the bolts 21 are loosened. A flange 27 is secured upon the hub of the die head 13 and receives the barrel 14, which is secured against rotation therein by means of a key 28. Encircling the flange 27 and a portion of the barrel 14, is the adjustment head 15, the fingers 16 projecting from the face of said head being inclined outward to fit within suitable diagonal openings 29 in the blocks 20. Said fingers 16 cause the slides 12 to move inward and outward when the adjustment head is moved axially. Such movement of said head may be obtained by suitable mechanism connected with a strap 30 revolubly seated in an annular groove 31 in said head.

The dies 10 are identical, each comprising an annular segment (Fig. 7); the inner surface or periphery 32 of the die is flat; the edges 33 and 34 of the die are also flat and are at right-angles to the inner surface, while the outer surface of the die presents a segmental rib 35 projecting outward from oppositely beveled marginal shoulders 36, 36ª, said rib being formed with longitudinal serrations 37 in the periphery thereof and also with a beveled margin 38. The holders 11 for the dies are also identical and the bases thereof are preferably, though not necessarily, formed as integral parts of the plates 19. As shown (Fig. 5), the base of a holder comprises a segmental abutment 39 and a segmental flange 40 spaced from said abutment and formed with an internally beveled shoulder 41 thereon. The inner surface 32 of each die rests against the outer face of the abutment 39; the edge 34 rests upon the plate 19 between the abutment 39 and flange 41 and the beveled shoulder 36 bears upon the beveled shoulder 41 of said flange. The cover 42 of the holder is a plate curved to correspond with the curvature of the die and abutment. Depending from the outer edge of said cover is a flange 43 having an internally beveled shoulder 44. This cover is supplied with apertures 45 to receive screws 46 which are turned in threaded bores 47 in the abutment 39. When said screws are set, the lower side of the cover bears upon the edge 33 of the die and the shoulder 44 on said cover bears upon the shoulder 36ª of the die; thus it will be seen that the die is securely clamped between the base and cover of the die holder and it will be further noted that the die is firmly held against the abutment 39 by reason of the co-action of said beveled shoulders 36, 36ª, 41 and 44. Frictional contact between the curved surface 32 of the die 10 and abutment 39 assists materially in securing the die.

These dies, like ordinary chasers, are sharpened by grinding off portions of the cutting ends thereof. This, of course, necessitates the removal and replacement of the dies. A die may be easily removed from its holder after loosening the set-screws 46, and when replaced may be accurately located by sliding in said holder until the cutting end strikes a stop 48 on the abutment 39 of said holder. The screws 46 may then be re-set to again secure the die.

My improved device is a distinct advance in the art because the dies being curved away from the work provide greater clearance, the curvature and great length of the dies minimizes the clamping pressure necessary to secure said dies in their holders and also decrease frequency of sharpening and prolong the life of the dies.

Having described my invention, what I claim as new and desire to protect by Letters Patent, is:

1. In a device of the class described, a semi-cylindrical die having a thread cutting enlargement upon its convex face, and inwardly beveled shoulders at the lateral margins of said face, a holder for the die consisting of a base and cover, the base having an annular abutment adapted to bear against the concave face of said die and a flange formed with a beveled shoulder to fit against one of the shoulders on said die, said cover having a beveled shoulder to fit against a shoulder on the die, and means to fasten the cover upon the base to clamp the die in said holder.

2. In a device of the class described, a semi-cylindrical die, a curved die holder, adapted to slidably receive and grip the die, said holder comprising a pair of clamping elements, and a stop on one of said elements against which the cutting end of said die abuts when in operative position.

3. In a device of the class described, a die head having a central bore therein adapted to receive objects to be threaded, substantially semi-cylindrically curved dies spaced about said bore, said dies having thread cutting enlargements upon their convex sides, said curvature and enlargements providing clearance between said dies and the threaded objects, and means to removably secure said dies to said head.

4. In a device of the class described, a die head, a die holder on said head comprising a base, a curved abutment thereon, a cover adapted to be secured to said abutment, and a semi-cylindrical longitudinally adjustable die having an enlargement on its convex surface, serrations on said enlargements, said die being adapted to be held with its concave side against said abutment.

Whereof, I have hereunto subscribed my name to this specification.

ALBERT CHARLES KLATT.